United States Patent
Evans

(10) Patent No.: US 11,680,828 B2
(45) Date of Patent: Jun. 20, 2023

(54) SEALED LINEAR ENCODER AND SEALING LIP FOR A SEALED LINEAR ENCODER

(71) Applicant: RENISHAW PLC, Wotton-under-Edge (GB)

(72) Inventor: Finlay Jonathan Evans, Malmesbury (GB)

(73) Assignee: RENISHAW PLC, Wotton-under-Edge (GB)

( * ) Notice: Subject to any disclaimer, the term of this patent is extended or adjusted under 35 U.S.C. 154(b) by 643 days.

(21) Appl. No.: 16/609,626

(22) PCT Filed: May 15, 2018

(86) PCT No.: PCT/GB2018/051306
§ 371 (c)(1),
(2) Date: Oct. 30, 2019

(87) PCT Pub. No.: WO2018/211255
PCT Pub. Date: Nov. 22, 2018

(65) Prior Publication Data
US 2020/0064163 A1    Feb. 27, 2020

(30) Foreign Application Priority Data
May 17, 2017   (EP) ..................................... 17275070

(51) Int. Cl.
*G01D 5/347*       (2006.01)
(52) U.S. Cl.
CPC ................................ *G01D 5/34769* (2013.01)

(58) Field of Classification Search
CPC ........... G01D 5/34769; G01D 5/34746; G01D 5/24438; G01D 11/245; G01B 21/02
See application file for complete search history.

(56) References Cited

U.S. PATENT DOCUMENTS

| | | |
|---|---|---|
| 3,926,062 A | 12/1975 | Neff |
| 4,490,915 A | 1/1985 | Burkhardt |
| 6,935,043 B2 | 8/2005 | Nakamura et al. |
| 9,291,482 B2 | 3/2016 | Kodama et al. |
| 2004/0065486 A1* | 4/2004 | Nakamura ............. G01D 11/24 177/210 R |
| 2005/0046413 A1 | 3/2005 | Schmidt et al. |
| 2013/0147286 A1* | 6/2013 | Aso ...................... F16C 29/082 310/12.33 |

(Continued)

FOREIGN PATENT DOCUMENTS

| | | |
|---|---|---|
| DE | 32 15 336 C1 | 6/1983 |
| DE | 34 02 613 C1 | 1/1991 |

(Continued)

OTHER PUBLICATIONS

Jul. 20, 2017 Extended European Search Report issued in European Patent Application No. 17275070.5.

(Continued)

*Primary Examiner* — Jennifer D Bennett
(74) *Attorney, Agent, or Firm* — Oliff PLC

(57) ABSTRACT

A sealed linear encoder apparatus provides a measure of relative displacement of two relatively movable members. The sealed linear encoder apparatus includes at least one elongate sealing lip wherein at least a sealing portion of the elongate sealing lip is held in tension along its length.

14 Claims, 5 Drawing Sheets

(56) References Cited

U.S. PATENT DOCUMENTS

| | | | |
|---|---|---|---|
| 2014/0338446 A1 | 11/2014 | Kodama et al. | |
| 2014/0339779 A1 | 11/2014 | Kodama et al. | |
| 2016/0011017 A1* | 1/2016 | Hayashi | G01D 5/34753 |
| | | | 33/707 |
| 2018/0073869 A1* | 3/2018 | Schweikl | G01D 5/34769 |

FOREIGN PATENT DOCUMENTS

| | | |
|---|---|---|
| DE | 41 01 579 A1 | 7/1992 |
| DE | 196 08 628 A1 | 9/1997 |
| DE | 10 2004 060 093 A1 | 6/2006 |
| JP | H02-42350 A | 2/1990 |
| JP | 2004-132735 A | 4/2004 |
| JP | 2014-224728 A | 12/2014 |

OTHER PUBLICATIONS

Aug. 27, 2018 Search Report issued in International Patent Application No. PCT/GB2018/051306.

Aug. 27, 2018 Written Opinion of the International Searching Authority issued in International Patent Application No. PCT/GB2018/051306.

* cited by examiner

Fig. 4
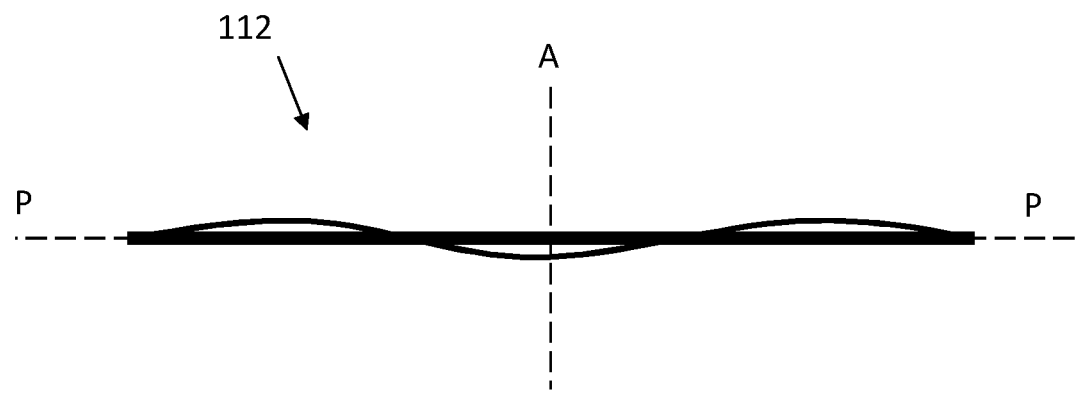
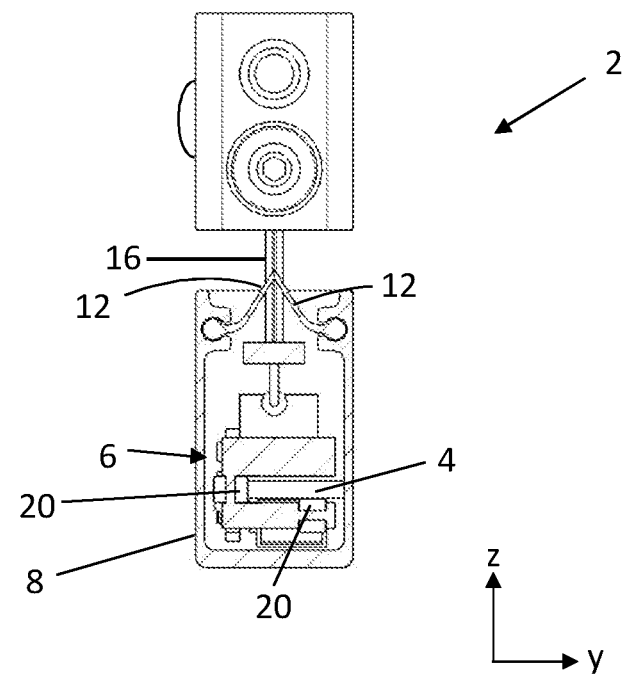
Fig. 5

SEALED LINEAR ENCODER AND SEALING LIP FOR A SEALED LINEAR ENCODER

The present invention relates to an encoder apparatus. More specifically, the invention relates to what is commonly known as a sealed encoder apparatus, also known as an enclosed encoder.

Encoders are typically used to measure the relative displacement between relatively moveable parts of a machine. For instance, encoders are used in many industries to provide position (or its derivatives, e.g. velocity and/or acceleration) feedback to a control system of a machine, e.g. feedback control for the position/motion of one part of a machine relative to another part of the machine. Typically, an encoder comprises a scale having a series of position features provided on one part of the machine and a readhead for reading the scale provided on the other part of the machine. Relative displacement of the first and second parts of the machine cause relative movement of the encoder scale and readhead allowing the extent of displacement to be determined. In other words, the relative position of scale and readhead, and hence the relative position of the machine parts, can be detected by the readhead along the encoder's measurement dimension.

The technologies utilised by such encoders can require that the environment in which they are used is clean and free of contamination, e.g. dust, dirt and moisture (which could, for example, be oil and/or water based). Contamination on the scale and/or readhead can adversely affect the performance of the encoder. In many industries machines that use encoders operate in an appropriately clean environment, in which case what is commonly referred to as an "exposed encoder" (or "open encoder") can be used.

It is known to use encoders in environments where contaminants are present, one example being machine tool environments. In machine tool environments contaminants such as coolant, oil, swarf and/or debris from an object being machined can contaminate the scale and/or readhead and interfere with the correct operating of the encoder. In these circumstances, sealed (also known as enclosed) encoders can be used. In order to minimise contamination, the scale and readhead can be encapsulated when used in machine tool environments and the like. Typically, the scale is provided within a protective housing, and at least one sealing lip (also referred to as a sealing member, strip or element) is typically provided which provides a seal between relatively moveable parts (e.g. between the protective housing and another part).

DE102004060093A1 and US2014/0338446 show example sealed encoders as described above.

Sealed encoders operating in machine tool environments or the like face the problem of the sealing lip being bombarded by contaminants including lubricating oil. Over time the effectiveness of the sealing lip can lessen, increasing the ability for contaminants to enter the protective housing and interfere with the correct operating of the encoder.

The present invention relates to an improved encoder apparatus. In particular, the invention relates to a sealed/enclosed encoder apparatus having an improved sealing configuration.

According to a first aspect of invention there is provided a sealed linear encoder apparatus for providing a measure of relative displacement of two relatively movable members, comprising at least one elongate sealing lip, wherein at least a sealing portion of the sealing lip is held in tension along its length (i.e. such that at least the sealing portion of the sealing lip is in net tension along its length).

It has been found that holding at least the sealing portion of a sealing lip in tension along its length can increase the longevity of the sealing lip. It has been found that the sealing lip is less prone to deformation which can reduce the effectiveness of the sealing lip.

As will be understood, the sealed linear encoder apparatus will comprise a scale and a readhead for reading the scale. The scale and at least a scale signal receiver of the readhead assembly may be located on a first side of the at least one elongate sealing lip (e.g. such that the sealing lip provides the scale and at least a scale signal receiver part of the readhead assembly with at least some protection from any contamination present on a second side of the at least one elongate sealing lip).

The at least one elongate sealing lip may comprise a root portion, e.g. via which the at least one elongate sealing lip may be mounted to a third party member such as a machine part or protective housing (explained in more detail below). The root portion can comprise one or more features for mounting the elongate sealing lip to a third party member. For example, the root portion can comprise a bulged portion of the elongate sealing lip, e.g. having a generally round or circular cross-sectional shape.

As will be understood the sealing portion comprises the portion of the elongate sealing lip which interacts with (e.g. touches) another member (e.g. another elongate sealing lip as described in more detail below) so as to provide a barrier to contamination. The sealing portion can comprise a region surrounding the part of the surface which interacts with (e.g. touches) another member. The region forming the sealing portion (which is therefore in tension in accordance with the invention) could comprise at least a quarter of the extent of the elongate sealing portion taken in a width direction, optionally at least a third of the extent of the elongate sealing portion taken in a width direction, for example at least half of the extent of the elongate sealing portion taken in a width direction.

The sealing portion of the at least one elongate sealing lip may be distal to the root portion. In other words, the root portion and the sealing portion of the elongate sealing lip can be disposed toward opposing edges of the elongate sealing lip. The sealing portion may be located toward (or at) the free edge of the elongate sealing lip, and the root portion may be located toward (or at) a fixed (e.g. mounted) edge of the elongate sealing lip. Accordingly, in accordance with the invention, optionally the free edge of the elongate sealing lip is held in tension along its length. Optionally, at least the quarter of the elongate sealing lip (taken in a width direction) that comprises the free edge of the elongate sealing lip is held in tension along its length. Optionally, at least the third of the elongate sealing lip (taken in a width direction) that comprises the free edge of the elongate sealing lip is held in tension along its length. Optionally, at least the half of the elongate sealing lip (taken in a width direction) that comprises the free edge of the elongate sealing lip is held in tension along its length.

Optionally the sealed linear encoder apparatus comprises a pair of elongate sealing lips, e.g. a first elongate sealing lip and a second elongate sealing lip. Each elongate sealing lip can comprise a sealing portion. The pair of elongate sealing lips can be configured to form a seal between their respective sealing portions. The sealing portion of the first elongate sealing lip may comprise the part of the first elongate sealing lip which contacts the second elongate sealing lip. The sealing portion of the second elongate sealing lip may comprise the part of the second elongate sealing lip which contacts the first elongate sealing lip. At least the sealing portion of the first and/or second elongate sealing lip can be held in tension along its length, in accordance with the invention.

A pair of elongate sealing lips may be provided by separate members. Optionally, each of the elongate sealing lips in a pair may be part of the same member.

Optionally, the tension of the at least one elongate sealing lip along its length varies across the width of the at least one elongate sealing lip. For example, the tension toward its free edge can be greater than the tension towards its fixed edge (e.g. seal root portion). Optionally, the tension of the at least one elongate sealing lip along its length is greater for the sealing portion than the root portion. Optionally the sealing portion of the at least one elongate sealing lip is under greater tension than the rest of the at least one elongate sealing lip.

Optionally the elongate sealing lip has a natural curvature. Optionally, the elongate sealing lip is deformed away from its natural curvature so as to hold at least the sealing portion in tension. The natural curvature may be about a notional axis perpendicular to the length and width of the elongate sealing lip. Optionally the elongate sealing lip is deformed into a less curved configuration, e.g. a straight configuration, so as to put the at least one sealing portion into tension. Optionally the length of at least the sealing portion of the elongate sealing lip is longer in the deformed state compared to the length of the sealing portion when exhibiting its natural curvature. Optionally, when exhibiting its natural curvature, (e.g. when the elongate sealing lip is not forced out of shape, e.g. when there is no external force on the elongate sealing lip; at least no external force about the notional axis perpendicular to the length and width of the elongate sealing lip) the edge proximal or within the sealing portion of the elongate sealing lip is shorter than the length of the edge proximal or within the root portion. Accordingly, optionally, when exhibiting its natural curvature, the length of the sealing portion of the elongate sealing lip is shorter than the length of the root portion of the elongate sealing lip.

The elongate sealing lip may comprise an element. The element may be elongate. The element may be longitudinal. Optionally the element is configured to induce the natural curvature in the elongate sealing lip. The element may be a wire, e.g. a metallic wire, such as a steel wire or a plastic wire. Optionally the element is a cord. Optionally the element is a glass fibre cord. Optionally the element is a fibrous filament. The element may be provided at/toward/proximal the root portion edge of the elongate sealing lip. The element may be provided in (e.g. embedded in) the root portion of the elongate sealing lip. Optionally the element is stiffer than the rest of the elongate sealing lip. Optionally, the longitudinal compressive stiffness of the element is greater than that of the rest of the elongate sealing lip. Optionally, the stiffness (e.g. compressive stiffness) of the material of the element is greater than that of the material of the elongate sealing lip surrounding the element. Optionally the element is under compressive stress when the elongate sealing lip is exhibiting its natural curvature. Optionally the element has higher strain energy compared to the rest of the elongate sealing lip when the elongate sealing is exhibiting its natural curvature.

Optionally, when the elongate sealing lip is exhibiting its natural curvature, the material of the elongate sealing lip toward the root portion edge of the sealing lip is under greater tension than the material of the elongate sealing lip toward the sealing portion edge of the elongate sealing lip. As will be understood, when an element, such as a wire or cord, is present and used to induce such tension, the element itself will be under compression, and so the "material" of the elongate sealing lip can include the material surrounding the element, but not the element itself. Accordingly, the "material" could be the main body, of the elongate sealing lip. Optionally, the "material" could be the plastics/elastomer material of the elongate sealing lip (as described in more detail below).

Optionally the sealed linear encoder apparatus comprises a protective housing. Optionally, the elongate sealing lip is held and deformed by the protective housing so as to hold at least the sealing portion of the sealing lip in tension. Optionally, the elongate sealing lip has a natural curvature and the protective housing holds the elongate sealing lip such that it deforms the elongate sealing lip into a less curved configuration, e.g. into a linear configuration. Optionally the protective housing comprises a seal root retainer portion for retaining the root portion of the elongate sealing lip. The root portion of the elongate sealing lip may have a greater natural curvature than the curvature of the at least one seal root retainer. In other words, optionally, the radius of curvature of the root portion of the elongate sealing lip is smaller than the radius of curvature of the at least one seal root retainer. Optionally, the seal root retainer portion is linear (in which case the radius of curvature is infinity). Optionally, the root portion of the elongate sealing lip is curved.

Optionally the scale and at least the scale signal receiver of the readhead assembly may be located within the protective housing (such that they are protected from contamination external to the protective housing). The protective housing may be connected to (or form part of) a first of two relatively movable parts of a machine (of which the encoder apparatus is configured to monitor the relative position). The readhead assembly may be connected to (or form part of) a second of the two relatively movable parts of a machine. A connector member may be provided between the second of the two relatively movable parts of the machine and at least the signal receiver. The protective housing may provide a longitudinal slot along which the connector member may travel. A seal can be provided along the length of the longitudinal slot to seal the slot and to allow the connector member (and therefore at least the scale signal receiver) to move along the slot while maintaining the seal. The connector member can comprise a (e.g. rigid) blade-like member. The blade-like member could comprise first and second edges (in other words, leading and trailing edges). The blade-like member could be tapered towards the first and second edges.

The material of at least the sealing portion of the elongate sealing lip may comprise plastics. The material of at least the sealing portion of the elongate sealing lip may comprise an elastomer. The elastomer may be acrylonitrile-butadiene rubber (NBR). The elastomer may be hydrogenated acrylonitrile butadiene rubber (HNBR). The elastomer may be ethylene propylene diene rubber (EPDM). The elastomer may be silicone rubber (such as VMQ). The elastomer may be a fluorinated elastomer. The fluorinated elastomer may be fluorocarbon-rubber (such as FKM). The fluorinated elastomer may be perfluorinated elastomers (such as FFKM). The fluorinated elastomer may be a tetrafluoro ethylene/propylene rubber (FEPM). The elastomer may be fluorosilicone rubber (such as FVMQ). The material of at least the sealing portion of the elongate sealing lip may comprise polyurethane (PU). The material of at least the sealing portion of the elongate sealing lip may comprise thermoplastic-polyurethane (TPU). The thermoplastic polyurethane (TPU) may be a polyester based thermoplastic polyurethane. The thermoplastic polyurethane (TPU) may be a polyether based thermoplastic polyurethane. Each of the herein mentioned materials of at least the sealing portion of the elongate sealing lip may be used in conjunction with any herein disclosed element (e.g. a metallic wire, such as a steel wire, or a plastic wire, or a cord such as a glass fibre cord, or a fibrous filament).

Optionally at least the sealing portion of the at least one sealing lip is held in an elastically deformed state.

Optionally at least a sealing portion of the elongate sealing lip is held in an elastically stretched configuration so as to put it into tension along its length. That is, optionally the least a sealing portion of the elongate sealing lip is held such that it is stretched within its elastic limit. Accordingly, the length of at least the sealing portion can be increased by virtue of being held in tension. The increase in length of at least the sealing portion is optionally at least 0.1%, optionally at least 0.5%, optionally at least 1%, optionally at least 2%, optionally at least 3%, optionally at least 4%, optionally at least 5%.

As will be understood, features of the above described aspects of the invention are also applicable to the below mentioned aspects of the invention, and vice versa.

According to a second aspect of invention there is provided a sealing lip for a sealed linear encoder apparatus, the elongate sealing lip having a natural curvature such that when it is pulled into a straight configuration at least a sealing portion of the elongate sealing lip is held in tension along its length.

Optionally when pulled into a straight configuration the length of at least the sealing portion is increased, the increase in length due to said tension is optionally at least 0.1%, optionally at least 0.5%, optionally at least 1%, optionally at least 2%, optionally at least 3%, optionally at least 4%, optionally at least 5%.

Optionally at least a sealing portion of the elongate sealing lip may be elastically deformable.

Embodiments of the invention will now be described, by way of example only, with reference to the accompanying drawings, in which:

FIGS. 1(a) and 1(b) are schematic illustrations of an embodiment of a sealed encoder apparatus comprising an elongate sealing lip according to an aspect of the present invention, in which part of the protective housing is cutaway to show the scale and scale signal receiver located inside the protective housing;

Figure 1A:
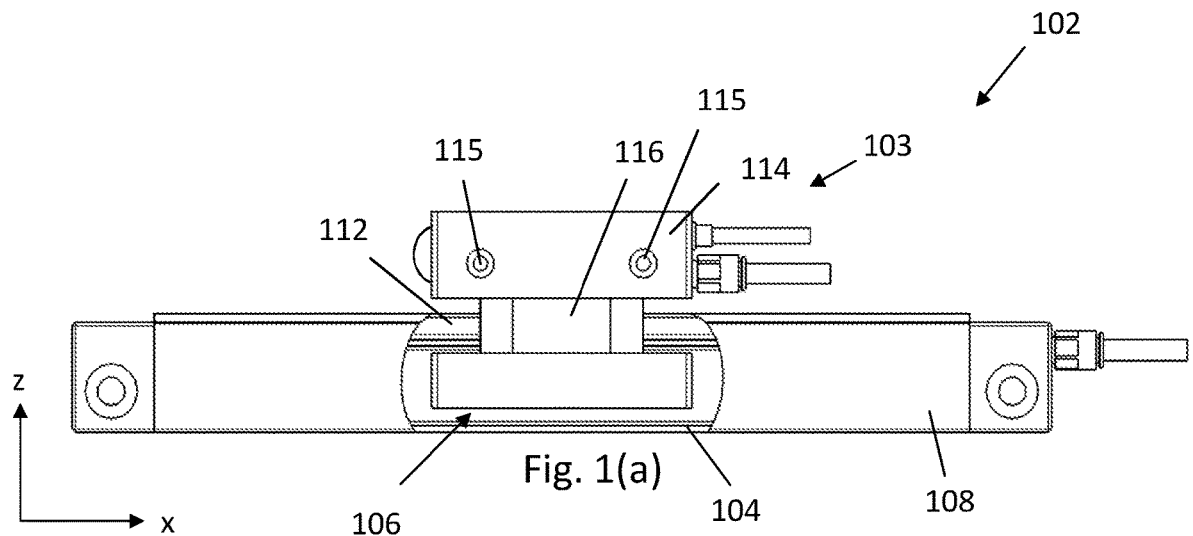
FIG. 1(c) is a cross-section through the sealed encoder apparatus of FIGS. 1(a) and 1(b)
FIG. 1(d) is a cross-section through a housing for sealed encoder apparatus of FIGS. 1(a) and 1(b) having separate base and side members.
Figure 1B:
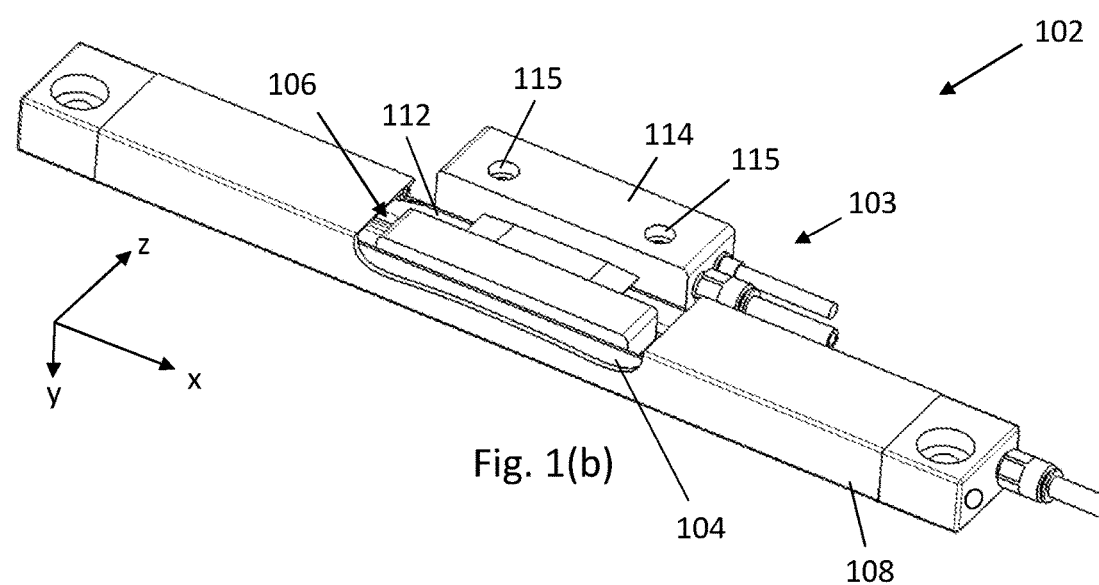
Figures 1C, 1D, 3:
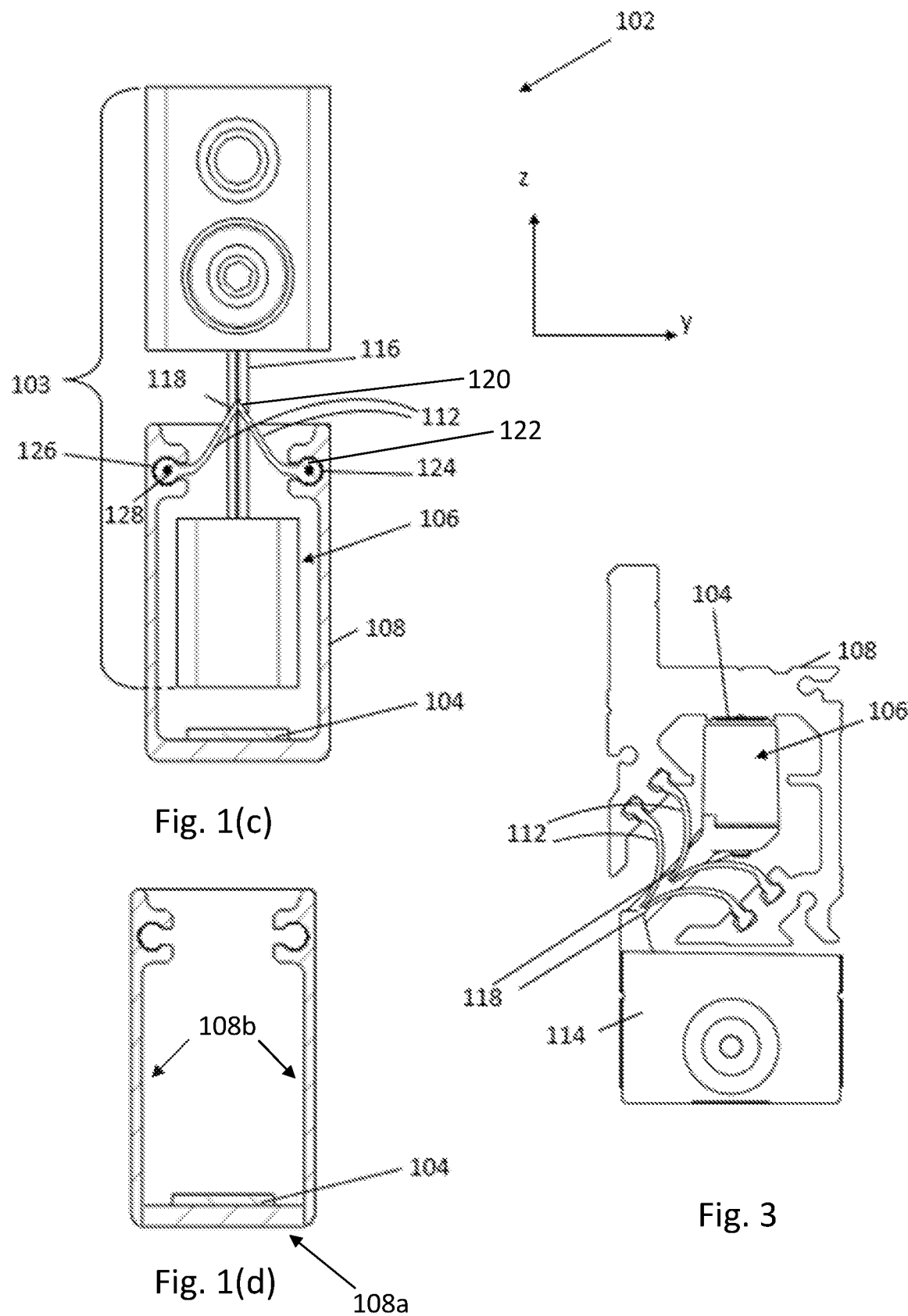
Figure 2A:
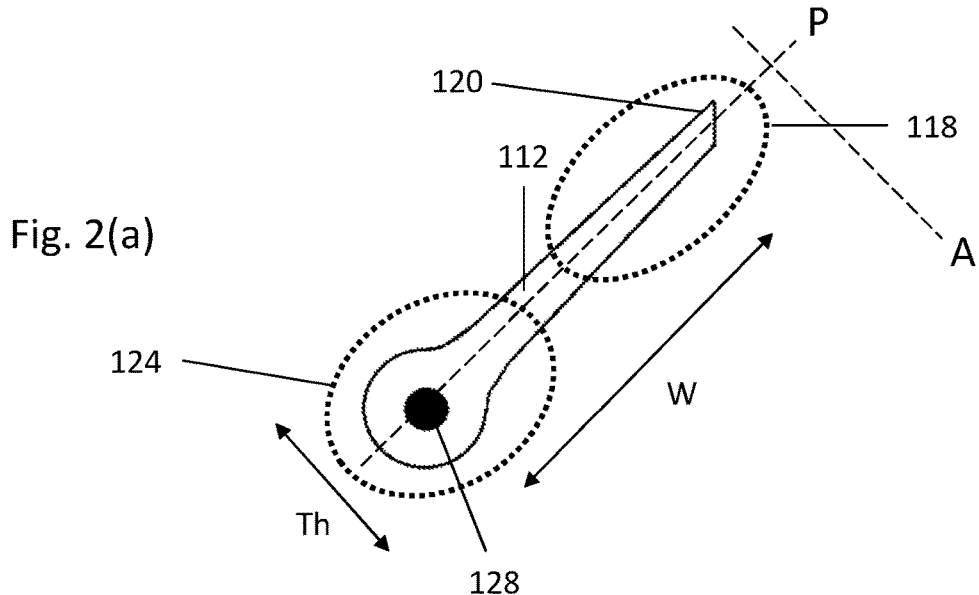
FIG. 2(a) is a cross section through an elongate sealing lip according to an embodiment of the invention.
Figure 2B:
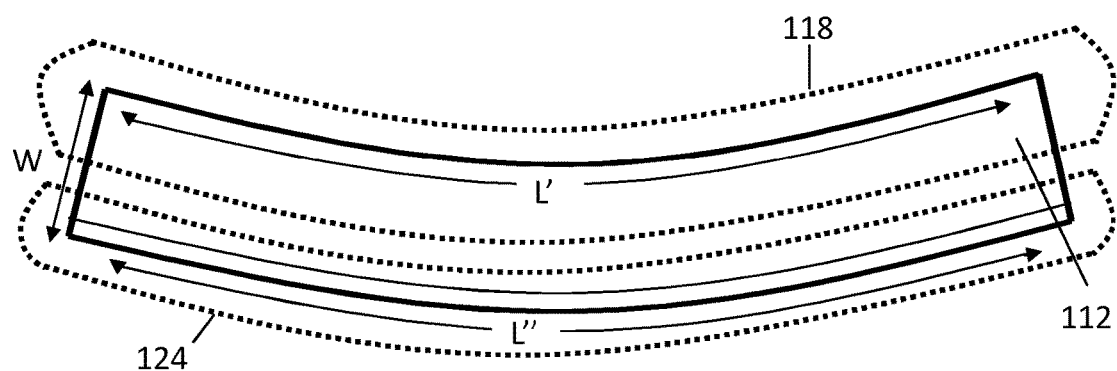
Figure 2C:
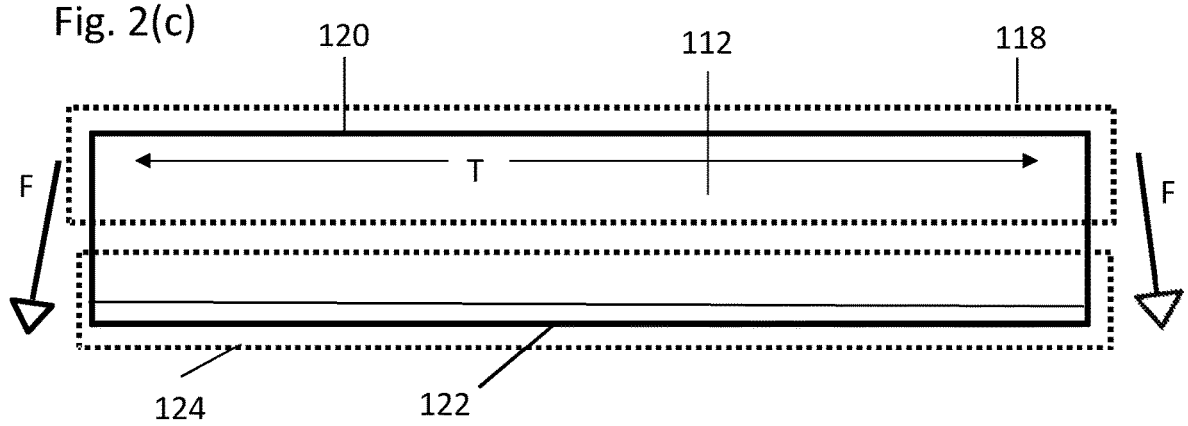
Figure 6:
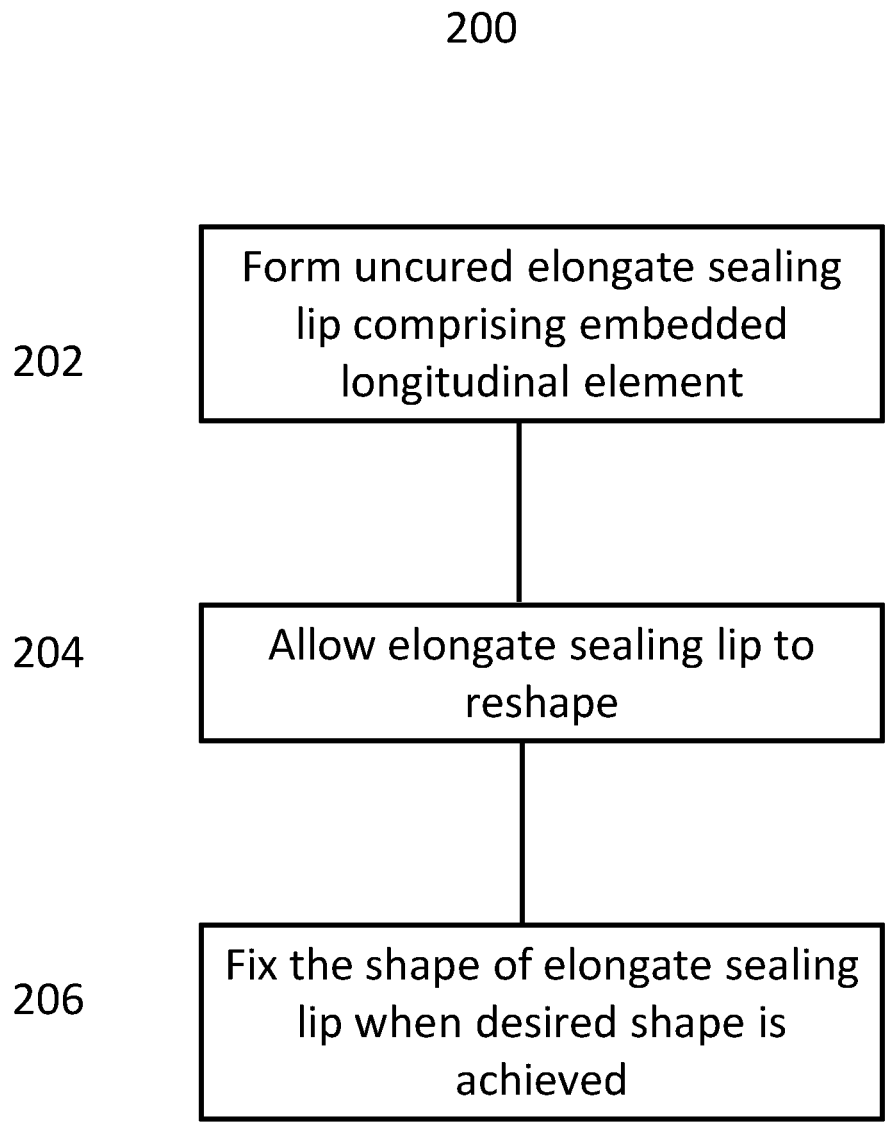

FIG. 2(b) schematically shows the elongate sealing lip of FIG. 2(a) in an equilibrium state prior to being mounted on a protective housing;

FIG. 2(c) schematically shows the conformation of the seal member of FIG. 2(b) when mounted in the linear seal root retainer of the protective housing of the encoder apparatus of FIG. 1;

FIG. 3 is a cross-section through an alternative embodiment of a sealed encoder apparatus comprising an elongate lip seal according to the invention;

FIG. 4 shows an elongate sealing lip as viewed plane P of FIG. 2(a);

FIG. 5 shows a cross section through a sealed integral bearing encoder comprising an elongate lip seal according to the invention; and FIG. 6 shows a flow diagram illustrating a method of making an elongate sealing lip according to the invention.

Referring to FIGS. 1(a) to 1(c) there is a sealed linear encoder apparatus 102 according to the invention. The sealed encoder apparatus 102 comprises a scale 104 having a plurality of features (not shown) and a readhead assembly 103, comprising a scale signal receiver 106 for receiving a signal from the scale. In the embodiment described the sealed encoder module 102 is an optical encoder, in that the readhead assembly 103 utilises electromagnetic radiation (EMR) in the infra-red to ultraviolet range in order to read the scale 104. In particular, in this described embodiment, the position measurement encoder apparatus is an optical absolute encoder. Accordingly, the scale comprises a series of uniquely identifiable features, e.g. codes, which the readhead assembly 103 can read and process to determine a unique position along the length of the scale 104. However, as will be understood, the position measurement encoder apparatus need not necessarily be an absolute encoder. For example, it could be an incremental optical encoder. Furthermore, the encoder apparatus need not be an optical encoder, for example, the encoder apparatus could be a magnetic, capacitive, or inductive encoder.

The scale 104 and scale signal receiver 106 are located inside a protective housing 108 which protects them from contaminants external to the protective housing. The scale 104 is fixed to the protective housing 108 whereas the scale signal receiver 106 can move along the length of the scale 104 within the protective housing 108. In use, the protective housing 108 will be secured to a first part of a machine (not shown) and the scale signal receiver 106 will be secured to a second part of the machine (not shown). In some cases, as shown in FIG. 1(d), the protective housing may be modular and may comprise a base member 108a to which the scale is affixed. The base member 108a may be a separate member from side members 108b which may be secured to base member 108a after the base member 108a has been affixed to a first part of a machine or the like. In other embodiments the base member 108a may form part of the first part of the machine. In further embodiments, the scale 104 may be attached to any one of the side members 108b and in still further embodiments, the protective housing may be attached to a machine via one of the side members 108b. As will be understood, the first and second parts of the machine are relatively moveable with respect to each other. The readhead assembly may further comprise a mounting block 114 which is to be directly fastened to the second part of the machine (e.g. via one or more releasable fasteners, such as threaded bolts passing through holes 115), and a blade 116 which is connected to and extends between the mounting block 114 and the scale signal receiver 106.

The protective housing 108 further comprises a seal in the form of first and second elongate sealing lips 112 (forming a pair of elongate sealing lips), which seals the inside of the protective housing 108, in which the scale 104 and scale signal receiver 106 reside, from external contaminants. The blade 116 passes between the first and second elongate sealing lips 112. The elongate sealing lips 112 are compliant so as to be able to part, allowing the movement of the blade 116 and hence the scale signal receiver 106 along the length of the protective housing 108 and therefore the scale 104, but are also sufficiently elastic so as to close together around the blade 116, thereby forming a physical barrier to solid and fluid (in particular liquid and moisture) contaminants. In other words, the blade 116 prises the first and second elongate sealing lips 112 apart as it moves along the length of the seal, between the first and second elongate sealing lips 112, and the first and second elongate sealing lips 112 have sufficient elasticity so as to close together in the absence of the blade 116.

When mounted in an encoder housing the first and second elongate sealing lips 112 have a free edge 120 and a fixed (e.g. mounted) edge 122. The first and second elongate sealing lips 112 each have a sealing portion 118, which is the portion of the elongate sealing lip 112 that interacts with (e.g. touches/engages) another member so as to close a gap. In the embodiment described, the physical barrier to solid and fluid contaminants is formed by the interaction of sealing portions 118 of elongate sealing lips 112 with one another and/or with the blade 116 when the blade 116 is present between the elongate sealing lips 112. The sealing portion 118 of each elongate sealing lip 112 comprises the part of the elongate sealing lip 112 which, in use forms the physical barrier by interaction with the sealing portion 118 of the other sealing lip 112 as well as the portion which forms the physical barrier by interaction with the blade 116. The sealing portion 118 of a first elongate sealing lip 112 has (i) a first sealing part which interacts with the second elongate sealing lip 112 and (ii) a second part which interacts with the blade 116 in order to form the physical barrier to solid and fluid contaminants. The first and second parts of sealing portion 118 in some embodiments may be coterminous, in other embodiments the first and second parts of sealing portion 118 may be overlapping areas, in further embodiments the first area may be wholly within the second area or the second area may be wholly within the first area and in still further embodiments the first and second areas of sealing portion 118 may be discrete areas.

The embodiment shown in FIG. 1(*c*) shows the seal comprising a pair of elongate sealing lips 112. As will be understood, the pair of elongate sealing lips 112 could be provided separately, e.g. as separate members, as is the case in this described embodiment. In other words, the seal could be made from a pair of separate seal members each of which comprise an elongate sealing lip 112. Alternatively, as will be understood, the seal may be made from a single seal member having an integral pair of elongate sealing lips 112.

At least the sealing portions 118 of elongate sealing lips 112 could be made from an elastomer, for example polyurethane, or a material composition comprising polyurethane. The elastomer may be, for example, acrylonitrile-butadiene rubber (NBR), hydrogenated acrylonitrile butadiene rubber (HNBR), ethylene propylene diene rubber (EPDM) or silicone rubber (VMQ). The elastomer may be a fluorinated elastomer, for example fluorocarbon-rubber (FKM), perfluorinated elastomers (FFKM) or tetrafluoro ethylene/propylene rubbers (FEPM). The elastomer may be, for example fluorosilicone rubber (FVMQ). The material of at least the sealing portion of the elongate sealing lip may comprise polyurethane (PU) and related compounds. The material of at least the sealing portion of the elongate sealing lip may comprise thermoplastic-polyurethane (TPU). The thermoplastic polyurethane (TPU) may be a polyester based thermoplastic polyurethane. The thermoplastic polyurethane (TPU) may be a polyether based thermoplastic polyurethane.

In use, at least the sealing portion 118 of the elongate sealing lips 112 is held in tension along its length. It has been found that by holding at least the sealing portion 118 in tension along its length, the integrity of the physical barrier to solid and fluid contaminants formed by the seal 111 can be maintained for a greater duration than if the sealing portion 118 were not held in tension.

On exposure to contamination such as coolant, oil or other fluids, the elongate sealing lip 112 may absorb the contaminant. In the case where the sealing portion 118 of the elongate sealing lip 112 is not held in tension, absorption of contamination can cause the material to swell and a resultant increase in the length of the sealing portion 118 may lead to buckling of the seal and compromise the integrity of the physical barrier. If, however at least the sealing portion 118 of the elongate sealing lip 112 is held in tension, it may be that upon absorption of contamination internal stresses within the sealing portion 118 are relieved prior to the sealing portion 118 swelling and having a chance to buckle. This can allow for a longer operation time before the sealing portions 118 of the elongate sealing lips 112 buckle and the integrity of the physical barrier is compromised. It could even be that holding the sealing portions 118 of the elongate sealing lips 112 in tension may allow the material of seal or at least the sealing portion 118 to reach a contaminant saturation point prior to buckling of the sealing portion 118 occurring and thus prevent the physical barrier from being compromised by this mechanism. If the increase in length of the sealing portion can be reduced, then the sealing lip can operate for a longer period before the seal geometry destabilises or the seal lip geometry may be prevented from destabilising due to absorption of contamination.

The seal need not have a pair of sealing lips 112. For example, it could comprise just a single elongate sealing lip 112, or optionally it could comprise more than two sealing lips depending on the requirements of the sealed encoder module 102 and protective housing 108.

FIG. 2(*a*) shows an example elongate sealing lip 112 in cross-section, showing the elongate sealing lip 112 extending in a seal width direction W (in which elongate sealing lip 112 can be wider/narrower) and in a seal thickness direction Th (in which elongate sealing lip 112 can be thicker/thinner). Elongate sealing lip 112 also extends in a length direction orthogonal to the width W and thickness Th directions (in which elongate sealing lip 112 can be longer/shorter). A notional plane P is shown passing through a seal root portion 124 and a notional axis A, orthogonal to plane P is also shown. FIG. 2(*b*) schematically shows the elongate sealing lip 112 prior to being mounted on protective housing 108 and in an equilibrium position, i.e. with no external forces acting on the elongate sealing lip 112. In particular, FIG. 2(*b*) shows that the elongate sealing lip 112 is non-linear, and in particular is curved. The elongate sealing lip 112 is curved such that the length L' (lying in plane P) of one of the elongate edges of the elongate sealing lip 112 is shorter than then length L" of the other elongate edge of the elongate sealing lip 112. In particular, the length L' (lying in plane P) of the edge proximal or within the sealing portion 118 of the elongate sealing lip 112 is shorter than the length L" of the edge proximal or within the root portion 124 of the elongate sealing lip 112. In other words, the natural curvature of the elongate sealing lip 112 is about notional axis A (see FIGS. 2(*a*) and 2(*b*)) that extends perpendicular to the length L and width W of the elongate sealing lip 112, such that one of the lengths L', L" of the elongate sealing lip 112 is shorter than the other.

As the elongate sealing lip 112 is in equilibrium, the curve schematically shown in FIG. 2(*b*) is the natural curvature of this embodiment. Other embodiments may have a different natural curvature. The desired curvature for elongate sealing lip 112 may be dictated by the application (in this case the dimensions of the linear encoder and the contaminants present in the environment in which the encoder will operate), material used and dimensions (thickness, width, length) of sealing lip itself. FIG. 4 shows that an edge of the elongate sealing lip 112 (the edge distal to the seal root portion 124 in the seal width direction) may in some embodiments undulate in a direction generally transverse to plane P.

It will be appreciated that elongate sealing lip 112 may not be conformationally restricted (i.e. elongate sealing lip 112 may be flexible) and may be able to curve about an axis parallel with the seal width direction W.

In order to provide protective housing 108 with the seal, the elongate sealing lips 112 are mounted in respective first and second seal root receiver channels 126 of the protective housing, shown in FIG. 1(c). In the embodiment illustrated seal root receiver channels 126 are linear and extend in a length direction (parallel to axis-x, FIG. 1(b)). In order to mount the elongate sealing lips 112, the elongate sealing lips 112 are drawn along their respective seal root receiver channels 126. In so doing the seal root portion 124 is deformed away from its natural curvature, this in turn causes at least the sealing portion 118 of the elongate sealing lip 112 to be deformed away from its natural curvature and for at least the sealing portion 118 of the elongate sealing lip 112 to be placed in tension. FIG. 2(c) shows schematically the deformation of the elongate sealing lip 112 as the seal root portion 124 is caused to conform to a linear conformation. The effective force applied by the linear conformation is schematically illustrated by arrows F which illustrate that effectively the ends of the elongate sealing lip 112 are pulled generally down to force the elongate sealing lip 112 out of its to natural curvature so as to become linear. This causes the length of the edge proximal or within the sealing portion 118 of the elongate sealing lip 112 to stretch, thereby increasing length L' (which lies in notional plane P) in length, which, as schematically illustrated in FIG. 2(c), puts the sealing portion 118 of the elongate sealing lip 112 in tension T. At least the material of the sealing portion 118 of the elongate sealing lip 112 is put in tension.

In some embodiments the increase in length of the sealing portion 118 shown in FIG. 2(c) when the deformation of the elongate sealing lip 112 as the seal root portion 124 is caused to conform to a linear conformation causes the length L' to be substantially equal to the length L".

The amount of tension applied to the elongate sealing lip 112, including at least the sealing portion 118, depends on the relative difference in curvature between the seal root receiver channels 126 and the respective elongate sealing lips 112. While in the present embodiment the seal root receiver channels 126 are described as linear this need not be the case. For example, in other embodiments the seal root receiver channels 126 may be curved. In the illustrated embodiment the seal root receiver channels 126 are continuous channels. However, this need not be the case and the seal root receiver channels 126 may take the form of a plurality of seal root receiver members, which together form a channel. In the above described embodiments, the first and second elongate sealing lips 112 are identical in configuration, and so are the seal root receiver channel 126. However, as will be understood, this need not necessarily be the case. For example, the first and second elongate sealing lips 112 could have different natural curvatures, different cross-sectional shapes, and/or different sizes. Likewise, the first and second receiver channels 126 could have different curvatures (e.g. one could be linear and the other curved), different cross-sectional shapes, and/or different sizes.

While holding at least a sealing portion 118 of an elongate sealing lip 112 in tension has been described in connection with the embodiment shown in FIGS. 1 to 4, it will be appreciated that there are many other ways of holding at least the sealing portion 118 of an elongate sealing lip in tension, e.g. by stretching the sealing lip 112 and maintaining the stretched state using clamps. In such a case elongate sealing lip 112 does not need to have a natural curvature and could take the form of a linear elongate sealing lip 112. A force may be applied in the elongate direction (i.e. parallel to axis-x in FIG. 1) to pull the ends of the linear elongate sealing lip 112 in the direction of desired tension T rather than applying a force having a component perpendicular to the desired direction of tension T as is the case in the embodiment shown in FIG. 2.

In one embodiment the elongate sealing lip 112 may be made by extrusion which may be in accordance with method 200 shown in FIG. 6. In the embodiment shown in FIG. 2(a) a wire 128 (such as a metal wire, plastic wire, fibrous filament or any other suitable similar element) is embedded in the seal root portion 124 during the extrusion process to form an uncured elongate sealing lip having an embedded longitudinal element (202). It will be appreciated that the wire 128 need not be embedded in the manner shown in FIG. 2(a) and the wire 128 may be embedded by being fixed to a surface of seal member 112 or the wire 128 may be embedded in other ways. After extrusion the elongate sealing lip 112 is allowed to reshape (which may include relaxing) 204. During reshaping 204 the presence of the wire 128 reduces the rate at which the material of part of the sealing strip 112 can contract. This means that the material in the elongate sealing lip 112 distal to the seal root portion 124 may contract at a different rate (which may be faster) than the material of the seal root portion 124 and this differential rate of contraction causes the seal to curve, for example about axis-A (204). This differential contraction may lead to puckering of edge of the elongate sealing lip 112 distal to the seal root portion 124 such as has been described above in relation to FIG. 4, this may be due to cooling effects. Once the desired curvature of the elongate sealing lip 112 has been obtained the material of the elongate sealing lip 112 is cured to fix the shape of the elongate sealing lip 112 (206).

It will be appreciated that the elongate sealing lips 112 may be made in alternative ways, including (but not limited to) injection moulding or other moulding methods. Moulding methods may be particularly advantageous if the seal is formed from a single seal member having a pair of opposed elongate sealing lips 112. Regardless of the method used, it may still be advantageous to include wire 128 in a seal root portion 124, e.g. to aid assembly of the encoder, however it will be understood that provision of a wire is optional.

In the embodiment described the scale signal receiver 106 does not bear against the scale 104. Accordingly, such a sealed encoder could be described as being "without integral bearing", or "bearingless", and is in contrast, for example, to the known configuration of a sealed "integral bearing" linear encoder which biases/bears the scale signal receiver against the scale and provides a compliant coupling between the scale signal receiver and its mounting block. An example of such an "integral bearing" arrangement is shown in FIG. 5. It will be appreciated that the invention is applicable to both bearingless and integral bearing encoders.

The sealing arrangement described herein allows for formation of a physical barrier to solid and liquid capable of accommodating the movement of blade 116 in relation to protective housing 108 as required by a bearingless or an integral bearing encoder. By placing at least a sealing portion 118 of an elongate sealing lip 112 in tension along its length, the usable lifetime of elongate sealing lip 112 is extended. This may allow the use of thinner and/or wider seals designed to cope with more challenging geometries/situations where a seal is required. The invention may allow the use of a wider range of materials which may have better dynamic properties and/or better wear resistance and/or other improved properties inherent to the material but which have previously suffered due to fluid/contaminant absorption and so been deemed to be unsuitable for certain situations, for example polyurethane.

The invention claimed is:

1. A sealed linear encoder apparatus for providing a measure of relative displacement of two relatively movable members, the sealed linear encoder apparatus comprising:
   a readhead assembly;
   a protective housing; and
   at least one elongate sealing lip, wherein:
   at least a sealing portion of the at least one elongate sealing lip is held in tension along a length of the sealing portion;
   the at least one elongate sealing lip has a natural curvature so as to be not straight; and
   the at least one elongate sealing lip is deformed away from the natural curvature into a less curved configuration by the protective housing so as to hold at least the sealing portion in tension.

2. The sealed linear encoder apparatus according to claim 1, wherein a seal root portion of the at least one elongate sealing lip is held and deformed by a seal root retainer portion of the protective housing.

3. The sealed linear encoder apparatus according to claim 2, wherein the at least one elongate sealing lip comprises a longitudinal element configured to induce the natural curvature in the at least one elongate sealing lip.

4. The sealed linear encoder apparatus according to claim 2, wherein the seal root portion of the at least one elongate sealing lip has a greater natural curvature than a curvature of the seal root retainer portion.

5. The sealed linear encoder apparatus according to claim 1, wherein the natural curvature is about a notional axis perpendicular to a length and width of the at least one elongate sealing lip.

6. The sealed linear encoder apparatus as claimed in claim 1, wherein the at least one elongate sealing lip is deformed by the protective housing into a straight configuration so as to put the sealing portion into tension.

7. The sealed linear encoder apparatus as claimed in claim 1, wherein a length of at least the sealing portion of the at least one elongate sealing lip is longer when the at least one sealing lip is deformed compared to the length of at least the sealing portion when the at least one elongate sealing lip exhibits the natural curvature.

8. The sealed linear encoder apparatus according to claim 1, wherein
   the at least one elongate sealing lip comprises a pair of elongate sealing lips, and
   the pair of elongate sealing lips are held for forming a seal between the sealing portions of the elongate sealing lips.

9. The sealed linear encoder apparatus according to claim 1, wherein at least the sealing portion of the at least one elongate sealing lip comprises an elastomer.

10. The sealed linear encoder apparatus as claimed in claim 1, wherein
    a scale and a scale signal receiver of the readhead assembly are located on a first side of the at least one elongate sealing lip, and
    the scale signal receiver can be connected to a part on a second side of the at least one elongate sealing lip.

11. The sealed linear encoder apparatus as claimed in claim 1, wherein at least the sealing portion of the at last one elongate sealing lip is held in an elastically stretched configuration so as to put at least the sealing portion into tension.

12. The sealed linear encoder apparatus as claimed in claim 1, wherein an increase in length of at least the sealing portion due to the tension is at least 0.5%.

13. An elongate sealing lip for a sealed linear encoder apparatus, the apparatus comprising:
    a readhead assembly; and
    a protective housing, wherein
    the elongate sealing lip has a natural curvature so as to be not straight and such that, when a seal root portion of the elongate sealing lip is pulled from the natural curvature into a straight configuration, at least a sealing portion of the elongate sealing lip is held in tension along a length of the sealing portion.

14. The elongate sealing lip for a sealed linear encoder apparatus as claimed in claim 13,
    wherein, when pulled into the straight configuration, the length of at least the sealing portion is increased, the increase in length due to the tension being at least 0.5%.

* * * * *